(12) United States Patent
Han et al.

(10) Patent No.: US 10,206,338 B2
(45) Date of Patent: Feb. 19, 2019

(54) BLOWER

(71) Applicant: Zhejiang Prulde Electric Appliance Co., Ltd., Zhejiang (CN)

(72) Inventors: Ting Han, Zhejiang (CN); Weiming Yang, Zhejiang (CN)

(73) Assignee: Zhejiang Prulde Electric Appliance Co., Ltd., Zhejiang (CN)

( * ) Notice: Subject to any disclaimer, the term of this patent is extended or adjusted under 35 U.S.C. 154(b) by 398 days.

(21) Appl. No.: 15/203,791

(22) Filed: Jul. 6, 2016

(65) Prior Publication Data

US 2017/0241423 A1   Aug. 24, 2017

(30) Foreign Application Priority Data

Feb. 22, 2016   (CN) .......................... 2016 1 0096791

(51) Int. Cl.
| | |
|---|---|
| *F04D 29/42* | (2006.01) |
| *A01G 20/43* | (2018.01) |
| *A47L 5/14* | (2006.01) |
| *A47L 9/28* | (2006.01) |
| *A01G 20/47* | (2018.01) |

(52) U.S. Cl.
CPC .............. *A01G 20/43* (2018.02); *A01G 20/47* (2018.02); *A47L 5/14* (2013.01); *A47L 9/2842* (2013.01); *A47L 9/2857* (2013.01); *F04D 29/4226* (2013.01)

(58) Field of Classification Search
CPC ........... A01G 20/43; A01G 20/47; A47L 5/14; A47L 9/2842; A47L 9/2857; A61M 16/0066; F04D 25/0606; F04D 29/023; F04D 29/4226; F04D 29/281; F04D 25/06; F04D 25/08; B02C 2201/066
See application file for complete search history.

(56) References Cited

U.S. PATENT DOCUMENTS

| | | | | |
|---|---|---|---|---|
| 4,325,163 A * | 4/1982 | Mattson | ................ | A47L 5/14 15/330 |
| 5,245,726 A * | 9/1993 | Rote | .................. | A47L 5/24 15/339 |

(Continued)

FOREIGN PATENT DOCUMENTS

| | | |
|---|---|---|
| CN | 201057998 | 5/2008 |
| CN | 201428645 | 3/2010 |

(Continued)

*Primary Examiner* — Eldon Brockman
(74) *Attorney, Agent, or Firm* — JCIPRNET

(57) ABSTRACT

A blower includes a blower body. The blower body includes a housing, an impeller arranged inside the housing, and a motor arranged in the housing and driving the impeller to rotate. The blower body includes an air inlet and an air outlet. The blower further includes a base and a regulating mechanism. The blower body is mounted on the base via the regulating mechanism, and the regulating mechanism includes a coupling member, a regulating knob and a resetting member. The blower body is rotatably mounted on the base via the coupling member, the regulating knob is arranged on the base and cooperates with the coupling member to limit the coupling member, and the resetting member is arranged on the base and cooperates with the regulating knob to cause the regulating knob to reset.

10 Claims, 6 Drawing Sheets

(56) References Cited

U.S. PATENT DOCUMENTS 5,440,781 A * 8/1995 Kitazawa .................. A47L 5/00
　　　　　　　　　　　　　　　　　　　　　　15/344
5,535,479 A * 7/1996 Pink ......................... A47L 5/14
　　　　　　　　　　　　　　　　　　　　　　15/330

FOREIGN PATENT DOCUMENTS

| CN | 203514240 | 4/2014 |
| CN | 203716096 | 7/2014 |
| CN | 204919445 | 12/2015 |

* cited by examiner

BLOWER

CROSS-REFERENCE TO RELATED APPLICATION

This application claims the priority benefit of China application serial no. 201610096791.1, filed on Feb. 22, 2016. The entirety of the above-mentioned patent application is hereby incorporated by reference herein and made a part of this specification.

TECHNICAL FIELD

The present invention relates to the technical field of mechanical equipment, and in particular, relates to a blower.

BACKGROUND

Electromotive tools having both the air suction function and the air blowing function are widely used in people's life and work. For example, blowers in the field of garden tools are mainly used to clean and collect fallen leaves.

Typically, the fan of a blower is a centrifugal fan. When the blower is in a blowing mode, the high-speed air flow injected from the blowing duct gathers the fallen leaves, dusts and small junks; and when the blower is in a suction mode, the fan rotates at a high speed and forms a suction air flow to suck up the fallen leaves, dusts and small junks into a collection device to complete the cleaning tasks.

For ease of use, a conventional blower is generally designed to a small-sized handheld one, and during operation, the air flow direction of the blower is fixed relative to the blower. If the air flow direction needs to be changed, the orientation of the blower will need to be adjusted, thus resulting in inconvenience.

SUMMARY

To solve the defects and disadvantages in the prior art, the present invention provides a blower which may adjust the air flow direction according to the operation needs.

To achieve the above objective, the blower of the present invention comprises a blower body that comprises a housing, an impeller arranged inside the housing and a motor arranged in the housing to drive the impeller to rotate. The blower body is further disposed with an air inlet and an air outlet that are connected to each other. The blower further comprises a base, and the blower body is mounted on the base via a regulating mechanism, and the regulating mechanism comprising a coupling member, a regulating knob and a resetting member. The blower body is rotatably mounted on the base via the coupling member, and the regulating knob is arranged on the base and cooperates with the coupling member to limit the coupling member, and the resetting member is arranged on the base and cooperates with the regulating knob to cause the regulating knob to reset.

The blower body is mounted on the base via the regulating mechanism and may rotate relative to the base, and then the direction of the air flow may be conveniently adjusted by regulating the direction of the blower body without moving the base. During the regulating operation, the regulating knob is pressed to detach from the coupling member, and then the resetting member deforms to make the coupling member staying at a rotatable state, and the coupling member synchronously rotates when the direction of the blower body is regulated. After the regulation, the regulating knob is released, and the resetting member drives the regulating knob to reset during the restoring process. After that, the reset regulating knob cooperates with the coupling member to realize the limiting function. The coupling member may not randomly rotate so as to keep the blower body stable relative to the base.

In an embodiment, at least two opened grooves are circumferentially provided at an end portion of the coupling member cooperating with the base, and limiting blocks cooperating with the open grooves are provided at an end of the regulating knob cooperating with the coupling member.

The open grooves are arranged in a circumferential direction of the end portion of the coupling member, such that the limiting block on the regulating knob may cooperate with the open grooves. The number of open grooves and the angle formed between the central lines of two adjacent open grooves may be disposed according to the operation needs.

In an embodiment, the resetting member is a spring with a length direction thereof being parallel to an axial line of the coupling member, and a baffle is provided on the base proximal to an end portion of the coupling member where the open grooves are provided, the spring and the coupling member are respectively arranged on two sides of the baffle, and two ends of the spring are respectively fixed to the regulating knob and the baffle, and the limiting blocks cooperate with the open grooves on the coupling member by crossing the baffle.

The spring has the performance characteristic of being in a compressed state when load is applied and restoring to its original shape under the free state. In addition, the spring may be frequently used, and is not easily subjected to elasticity failure. When a force is applied to the regulating knob, the limiting block on the regulating knob may detached from the open groove, and the spring may deform. After the regulation of the blower body, the spring restores to its original shape by releasing the regulating knob, and then the spring drives the regulating knob to move, meanwhile, when the regulating knob moves, the limiting block is driven to snap into the open groove.

In an embodiment, the coupling member comprises a first coupling member and a second coupling member with axial lines thereof coinciding, and fixing holes cooperating with the first coupling member and the second coupling member are arranged on two opposing sides of the blower body. Mounting holes cooperating with the first coupling member and the second coupling member are arranged on the base, and the end portion of the first coupling member cooperating with the blower body and the end portion of the second coupling member cooperating with the blower body are both non-circular, while the end portion of the first coupling member cooperating with the base and the end portion of the second coupling member cooperating with the base are both circular. Moreover, the first coupling member or the second coupling member is provided with a threading hole respectively, and the open groove is arranged at the end portion of the first coupling member cooperating with the base or the end portion of the second coupling member cooperating with the base.

The coupling member is designed with to a split type structure so that the blower is integrally more compact. The end portion of the first coupling member cooperating with the blower body and an end portion of the second coupling member cooperating with the blower body are both non-circular, and the end portion of the first coupling member cooperating with the base and an end portion of the second coupling member cooperating with the base are both circular, so that the first coupling member, the second coupling member and the blower body may simultaneously rotate relative to the base, thereby realizing the regulation of the blower body relative to the base.

In an embodiment, the base comprises an upper base and a lower base, in which, one side of the upper base is coupled to the blower body via the first coupling member, and one side of the lower base is coupled to the blower body via the second coupling member, and a handle is arranged between the other side of the upper base and the other side of the lower base.

The base is arranged with a handle, so that the blower can be conveniently to be lifted and carried. Further, a soft rubber sleeve may be wrapped outside the handle, and anti-slip patterns may be arranged on an outer wall of the soft rubber sleeve to enlarge the action force between the handle and the palm when the blower is lifted, thereby achieving an anti-slip effect.

In an embodiment, the blower body further comprises a blower cover fixed on the outer wall of the housing, and the blower cover is provided with an illumination mechanism and a illumination switch configured to control the on-and-off of the illumination mechanism.

In an embodiment, the illumination mechanism comprises a substrate, and the substrate is arranged with lamp beads on it; the blower cover is provided with recess grooves cooperating with the illumination mechanism on one side that is against the blower cover, and the bottom wall of the recess groove is provided with fixture holes cooperating with the lamp beads, and the substrate is fixed to one side of the blower cover facing towards the housing and the lamp beads extends into the recess grooves after penetrating through the fixture hole, and the blower cover is provided with transparent plates cooperating with the recess grooves.

With the illumination mechanism providing on the housing, during the operation under a dark environment, the illumination mechanism may be switch on to provide lighting. Therefore, there is no need to dispose an illumination line or illumination device additionally, and the working cost may be reduced and the working efficiency may be improved.

In an embodiment, the housing is provided with an air suction duct at a position thereof corresponding to the air inlet, and the blower cover is provided with a recessed cavity cooperating with the air suction duct on the side that faces towards the housing; the air suction duct is provided with a snap groove at the end portion that is far away from the housing, and the inner wall of the recess chamber is provided with a snap-fit post cooperating with the snap groove, and the blower cover is provided with an air duct communicating with the recessed cavity on the side that is against the housing.

In an embodiment, the blower body is provided with a dust suction air outlet and a fan air outlet; the housing is provided with a cover plate configured to close the dust suction air outlet or the fan air outlet. The cover plate is with an arc shape and is slidably arranged on the inner wall of the housing, and the outer wall of the cover plate is provided with a shifting block extending out of the housing, and the housing being provided with an arc groove cooperating with the shifting block.

The blower body is provided with the cover plate configured to close the dust suction air outlet or the fan air outlet, so that the dust suction air outlet or the fan air outlet may be closed according to the actual needs. When the fan air outlet is closed, the blower implements the dust removing and cleaning function. When the dust suction air outlet is closed, the blower may be used as a common fan.

In an embodiment, the blower further includes a battery mechanism, a bottom portion of the base and a top portion of the battery mechanism are respectively provided with a fixture block and a coupling groove cooperating with each other.

When the battery mechanism cooperating with the base is arranged at the bottom portion of the base, the blower may directly work with the mains power as the power source, or may work with the battery mechanism as the power source. Therefore, use of the blower may not limit to the location of the power source, thereby improving universality of the use of the blower and enlarging the application scope of the blower.

The blower according to the present invention has a simple overall structure, and the blower body is mounted on the base via the regulating mechanism and is capable of regulating the angle relative to the base according to the placement location or actual needs. Therefore, the blower may be universally used and has a compact overall structure.

With the blower cover and the illumination mechanism arranged on the outer wall of the housing, the blower is capable of working in a dark environment without additional illumination device or equipment, thereby further improving the universality of the blower.

When the battery mechanism cooperating with the base is arranged at the bottom portion of the base, the blower may directly work with the mains power as the power source, or may work with the battery mechanism as the power source. Therefore, use of the blower is not limited to the location of the power source, thereby enlarging the application scope of the blower.

A plurality of air outlets are arranged on the blower body, and a corresponding air outlet may be closed or opened by sliding the cover plate according to the actual needs to change the operation mode of the blow, thereby effectively extending the function and use of the blower.

DETAILED DESCRIPTION

The present invention is further described hereinafter with reference to the accompanying drawings.

Figure 1:
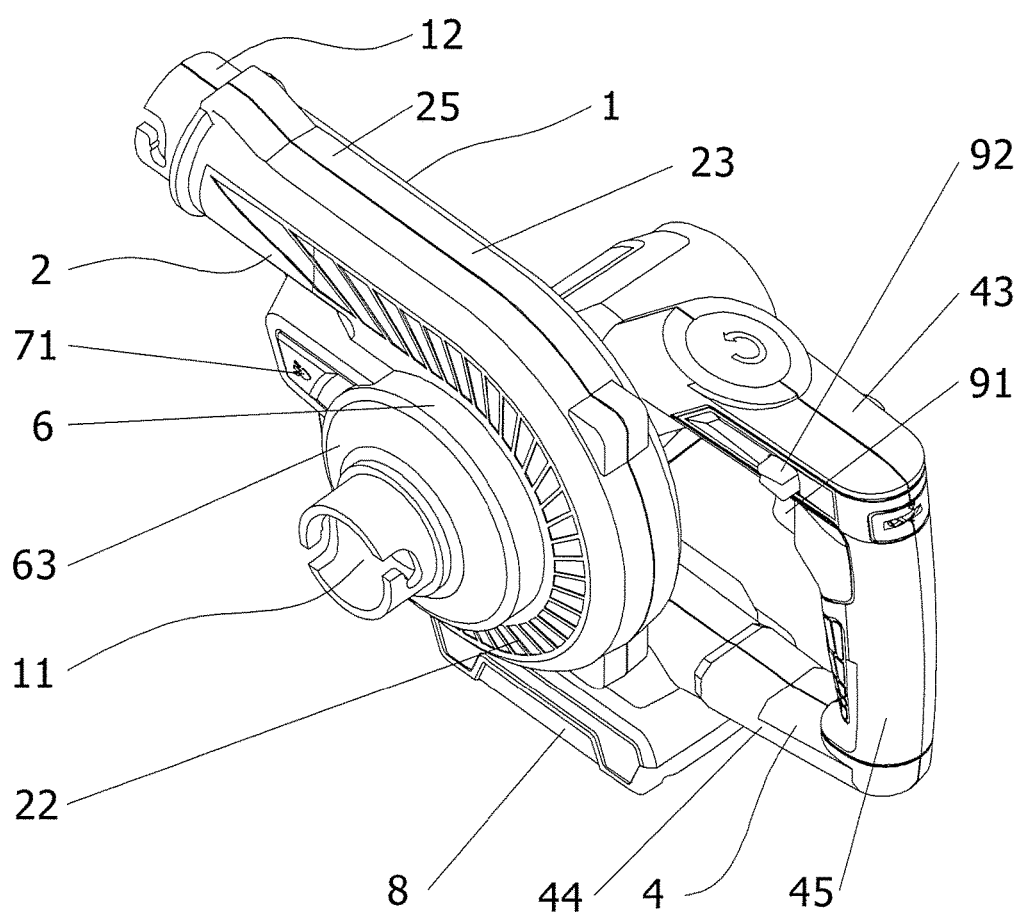
FIG. 1 is an overall three-dimensional view of a blower according to the embodiment of the present invention.
Figure 2:
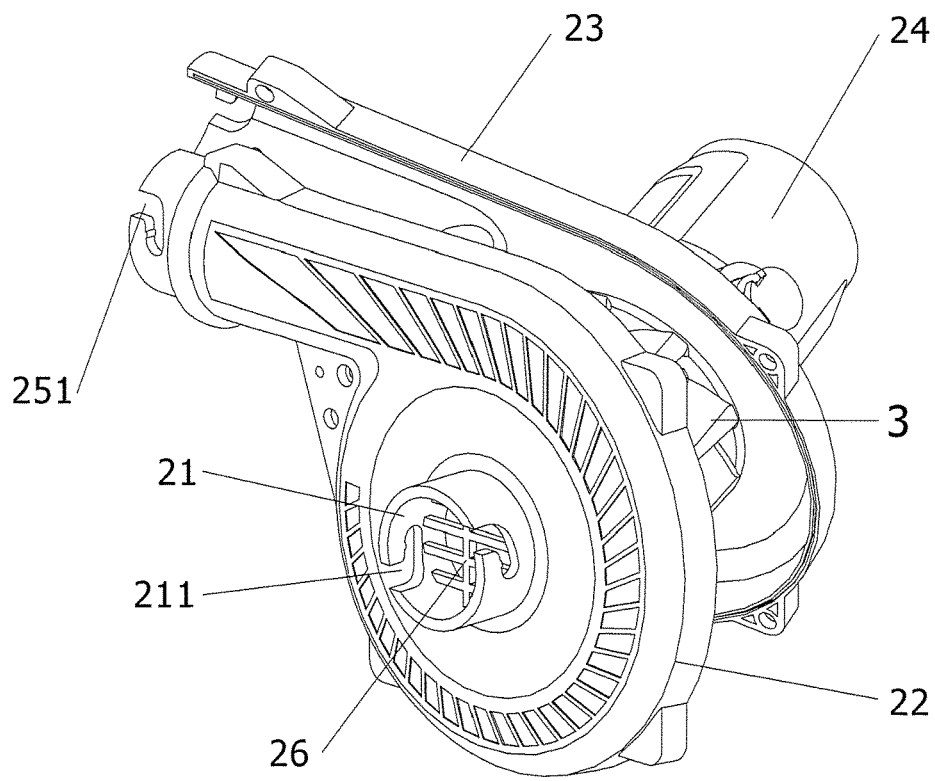
FIG. 2 is a schematic view of a blower body of the blower according to the embodiment of the present invention.

As illustrated in FIG. 1 and FIG. 2, a blower according to an embodiment of the present invention comprises a blower body 1, a base 4 and a battery mechanism 8. The blower body is provided with an air inlet 11 and an air outlet 12 that are interconnected, and the blow body 1 comprises a housing 2, an impeller 3 disposed inside the housing and a motor (not illustrated in the drawings) disposed in the housing for driving the impeller 3 to rotate. The blower body 1 is disposed on the base 4 via a regulating mechanism.

The housing 2 comprises a left housing 22 and a right housing 23 which are fixedly coupled with each other. The left housing is provided with an air suction duct 21 which extends outward horizontally away from the right housing. A first fixture groove 211 is disposed at the end portion that is far away from the left housing 22. The right housing 23 is provided with a protrusion 24 which extends outward away from the left housing 22. The protrusion is hollow so as to define a chamber for accommodating the motor. Heat dissipating holes are evenly disposed on the end surface of the protrusion that is far away from the right housing 23. In which, a central line of an upper chamber of the protrusion along the longitudinal direction, an axial line of a power output shaft of the motor, an axial line of the impeller 3 and an axial line of the air suction duct 21 are position in the same direction. A grid 26 is disposed at the end portion of the air suction duct 21 proximal to the left housing 22.

An upper portion of the housing 2 is provided with an air blowing duct 25 forming the air outlet 12, wherein the axial direction of the air blowing duct is perpendicular to the axial direction of the air suction duct 21, and the end of the air blowing duct is provided with a second fixture groove 251 configured to couple with other components. The flowing direction of the air flow at the air inlet 11 is parallel to the axial direction of the impeller 3, and the flowing direction of the air flow at the air outlet 12 is perpendicular to the axial direction of the impeller.

Figure 3:
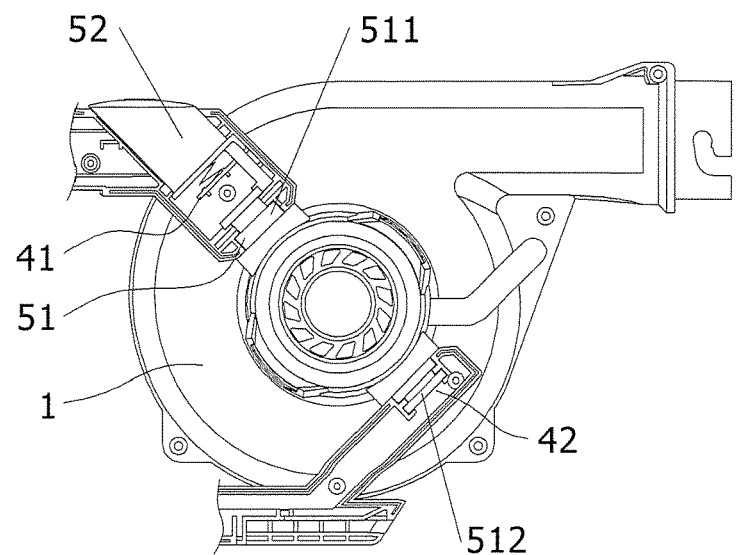
FIG. 3 is a schematic view illustrating cooperation of a regulating mechanism, a base and the blower body of the blower according to the embodiment of the present invention.
Figure 4:
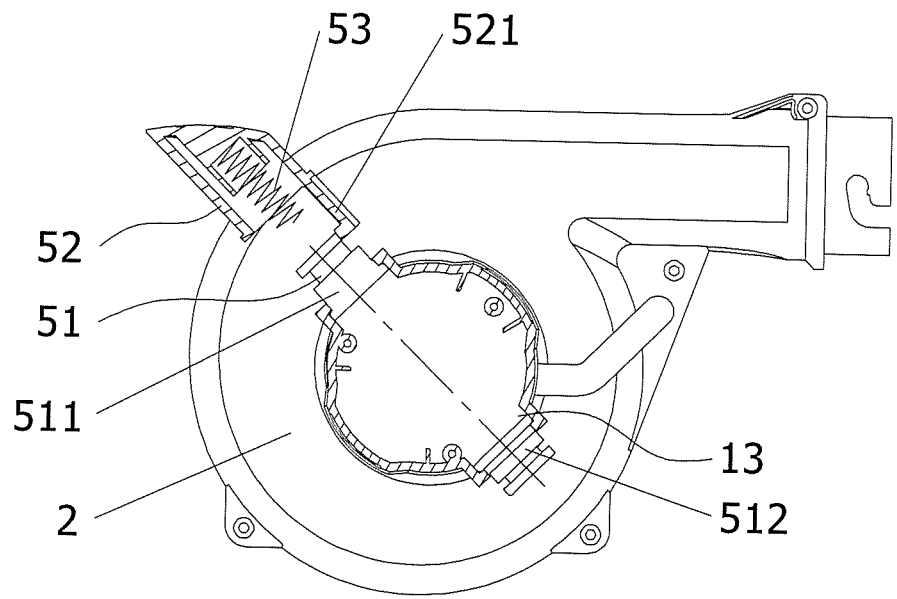
FIG. 4 is a schematic view illustrating cooperation of the regulating mechanism and the blower body of the blower according to the embodiment of the present invention.

As illustrated in FIG. 3 and FIG. 4, the regulating mechanism comprises a coupling member 51, a regulating knob 52 and a resetting member 53. The compression direction of the resetting member, the forward and backward movement direction of the regulating mechanism and the axial direction of the coupling member are consistent. The blower body 1 is rotatably mounted on the base 4 via the coupling member 51. The regulating knob 52 is arranged on the base 4 and cooperates with the coupling member 51 to limit the coupling member. The resetting member 53 is arranged on the base 4 and cooperates with the regulating knob to drive the regulating knob to reset.

At least two opened grooves 54 are circumferentially provided at the end portion of the coupling member 51 cooperating with the base 4, and limiting blocks 521 cooperating with the open grooves that is disposed on the coupling member are provided on the regulating knob 52. The resetting member 53 employs a spring, with a length direction being parallel to the axial line of the coupling member 51. A baffle 41 is provided on the base 4 proximal to the end portion of the coupling member where open grooves are provided. The spring and the coupling member are respectively arranged on two sides of the baffle 41, and two ends of the spring are respectively fixed to the regulating knob 52 and the baffle 41, and the limiting blocks 521 cooperate with the open grooves 54 that is disposed on the coupling member by crossing the baffle 41.

In the present embodiment, in order to maintain stability of the entire blower body, the coupling member 51 comprises a first coupling member 511 and a second coupling member 512 with axial lines thereof coinciding. Since the motor is heavy, to ensure smooth working of the entire blower, fixing holes 13 cooperating with the first coupling member 511 and the second coupling member 512 are symmetrically arranged on the protrusion 24 of the right housing 23, and mounting holes 42 cooperating with the first coupling member and the second coupling member are arranged on the base 4.

Figure 5:
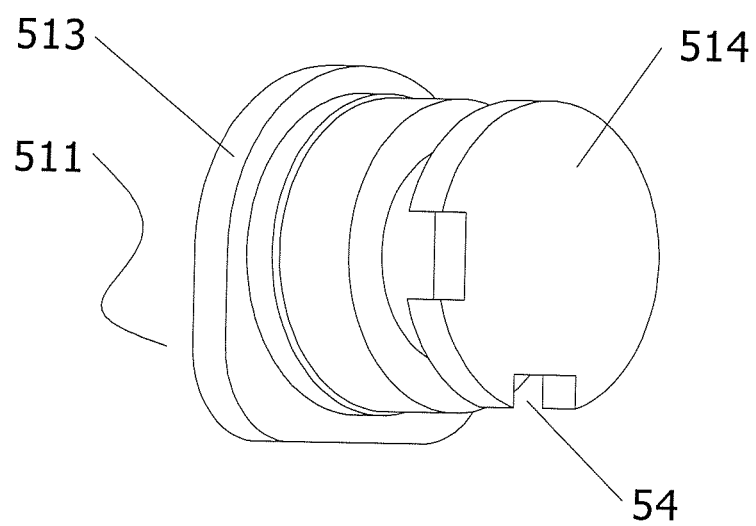
FIG. 5 is a three-dimensional view of a first coupling member of the blower according to the embodiment of the present invention.

As illustrated in FIG. 5, one axial end of the first coupling member 511 foul's the first coupling portion 513 cooperating with the fixture holes 13, and the other axial end of the first coupling member forms the second coupling portion 514 cooperating with the mounting holes 42, wherein the cross section of the first coupling portion and the cross section of the second coupling portion are both greater than the cross section of an intermediate portion of the first coupling member.

Figure 6:
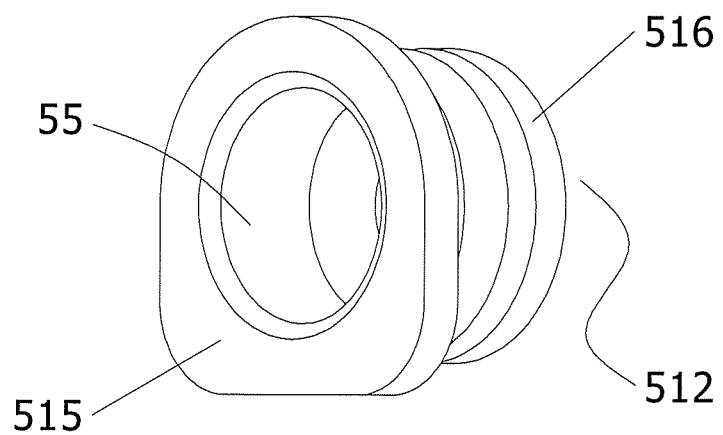
FIG. 6 is a three-dimensional view of a second coupling member of the blower according to the embodiment of the present invention.

As illustrated in FIG. 6, one axial end of the second coupling member 512 forms the third coupling portion 515 cooperating with the fixture holes 13, and the other axial end of the first coupling member forms the fourth coupling portion 516 cooperating with the mounting holes 42, wherein the cross section of the third coupling portion and the cross section of the fourth coupling portion are both greater than the cross section of an intermediate portion of the second coupling member.

To make the blower body 1 rotate relative to the base 4, each of the first coupling portion 513 and the third coupling portion 515 has a non-circular cross section, and each of the second coupling portion 514 and the fourth coupling portion 516 has a circular cross section. Correspondingly, the fixture holes 13 are designed to a shape cooperating with the first coupling portion and the third coupling portion, and the mounting holes are designed to a circular shape.

The open grooves 54 are arranged circumferentially on the second coupling portion 514, and the number of the open grooves and the angle formed between central lines of two adjacent open grooves may be defined according to the actual needs. For facility the conductive configuration, the first coupling member 511 or the second coupling member 512 are provided with threading holes 55 along the axial direction. In this embodiment, there are two open grooves 54, and the angle formed between central lines of two adjacent open grooves is 90 degrees, and the threading holes 55 are arranged on the second coupling member 512.

The base 4 comprises an upper base 43 and a lower base 44, wherein one side of the upper base is coupled to the blower body 1 via the first coupling member 511, and one side of the lower base is coupled to the blower body 1 via the second coupling member 512. A handle 45 is arranged between the other side of the upper base and the other side of the lower base, and a soft rubber sleeve is wrapped outside the handle, and the soft rubber sleeve is further provided with anti-slip patterns.

The base 4 is formed by fixedly coupling a left housing and a right housing, and the length of the upper base is less than the length of the lower base. To make the entire blower stable and reduce the size of the whole blower, the axial line of the coupling member 51 and the vertical central plane cooperatively with the left and right housings which form the base 4 are in the same vertical plane. The axial line of the coupling member forms an angle with the horizontal plane. In the present embodiment, the angle formed between the axial line of the coupling member 51 and the horizontal plane is preferably 45 degrees.

Figure 7:
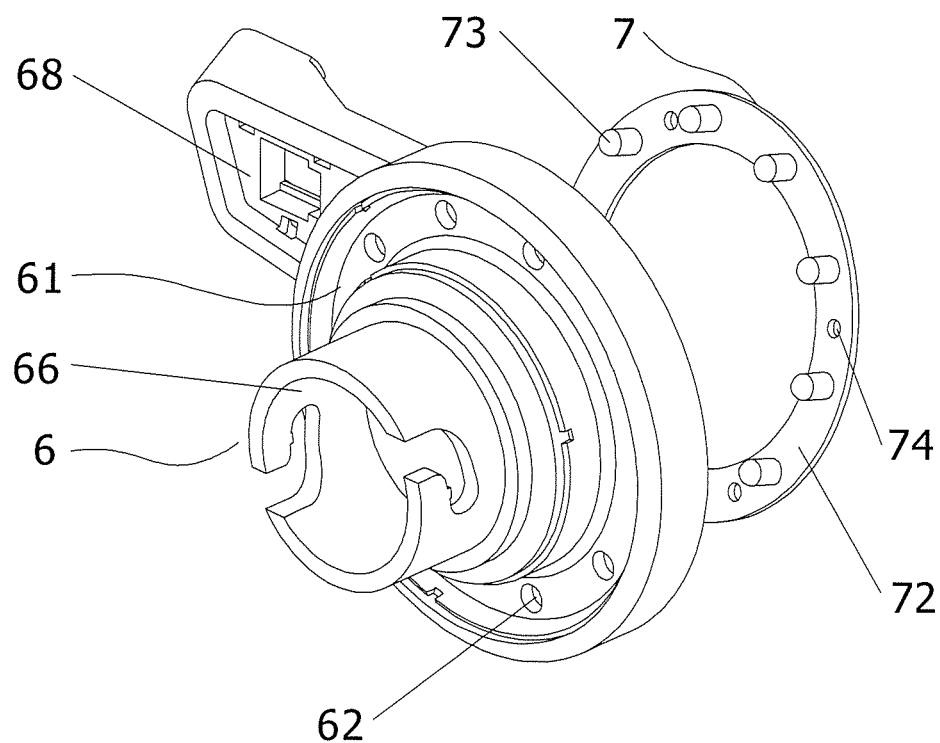
FIG. 7 is a schematic view illustrating cooperation of a blower cover and an illumination mechanism of the blower according to the embodiment of the present invention.

As illustrated in FIG. 7, a blower cover 6 is fixed on an outer wall of the left housing 22, wherein the blower cover is provided with an illumination mechanism 7 and an illumination switch 71 configured to switch on-and-off of the illumination mechanism. The illumination mechanism 7 comprises a substrate 72 where lamp beads 73 are uniformly arranged. The blower cover 6 is provided with recess grooves 61 cooperating with the illumination mechanism 7 on the side thereof going against the housing 2, and the bottom wall of the recess groove is provided with fixture holes 62 cooperating with the lamp beads, and the substrate is fixed to the side of the blower cover facing towards the housing while the lamp beads extend into the recess grooves after penetrating through the fixture holes, and the blower cover is provided with transparent plates 63 cooperating with the recess grooves.

For the assembling convenience, the substrate 72 is provided with a plurality of limiting holes 74, and the blower cover is uniformly provided with locating posts 67 cooperating with the locating holes on one side thereof facing towards the housing.

The blower cover 6 is provided with a fixture port 68 cooperating with the illumination switch 71, and the illumination switch cooperates with the fixture port via a snap-fit structure and is detachably coupled to the blower cover 6.

Figure 8:
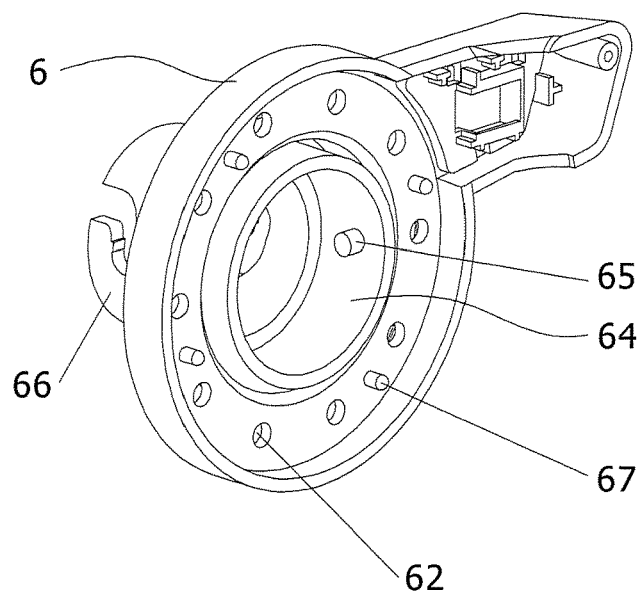
FIG. 8 is a three-dimensional view of the blower cover of the blower according to the embodiment of the present invention.

As illustrated in FIG. 8, the blower cover 6 is provided with a recess chamber 64 cooperating with the air suction duct 21 on one side thereof facing towards the housing 2, wherein the inner wall of the recess chamber is provided with a snap-fit post 65 cooperating with the first fixture groove 211, and the blower cover is provided with an air duct 66 in communication with the recess chamber on one side thereof that is against the housing, and the air suction duct is provided with a fixture groove coupling with other parts at the end portion thereof distal from the housing.

In the present embodiment, the recess groove 61 is in an annular shape and is arranged in an outer circumference of the air duct 66, while the substrate 72 and the transparent plates 63 are also in an annular shape.

To enlarge the application scope of the blower, the blower body 1 is provided with two air outlets, wherein one is a dust suction air outlet and the other is a fan air outlet; the housing 2 is provided with a cover plate configured to close the dust suction air outlet or the fan air outlet, wherein the cover plate is in an arc shape and is slidingly mounted on the inner wall of the housing, and the outer wall of the cover plate is provided with a shifting block extending out of the housing; and the housing is provided with an arc groove cooperating with the shifting block.

Figure 9:
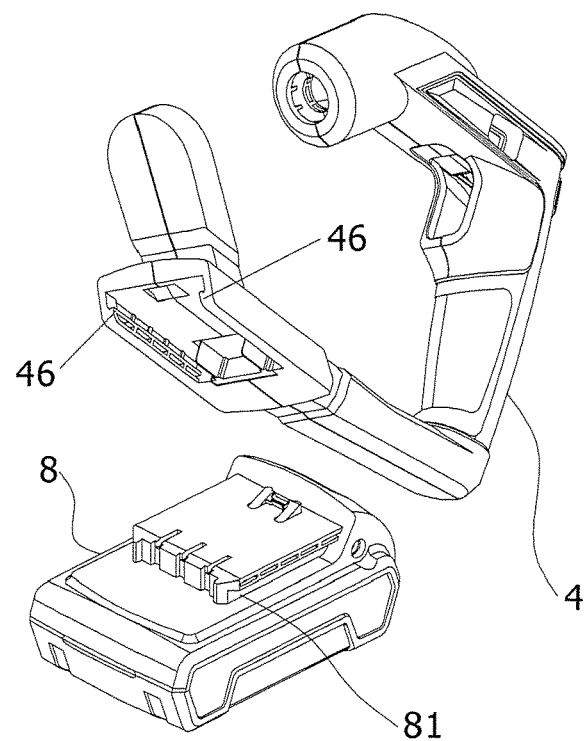
FIG. 9 is a schematic view illustrating cooperation of a battery mechanism and the base of the blower according to the embodiment of the present invention.

As illustrated in FIG. 9, the blower further comprises a battery mechanism 8, the bottom portion of the base 4 and the top portion of the battery mechanism are each provided with a fixture block 46 and a coupling groove 81 cooperating with each other. The top portion of the battery mechanism is further provided with a power socket, and the bottom portion of the base 4 is provided with a plug cooperating with the power socket.

Figure 10:
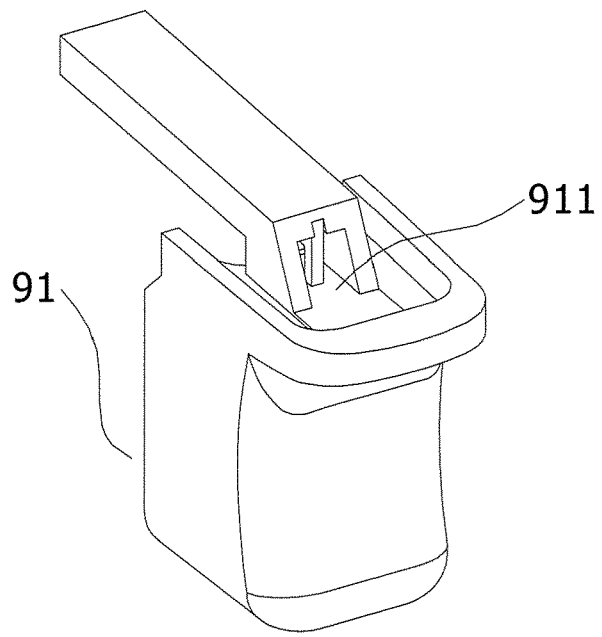
FIG. 10 is a three-dimensional view of a self-locking knob of the blower according to the embodiment of the present invention.
Figure 11:
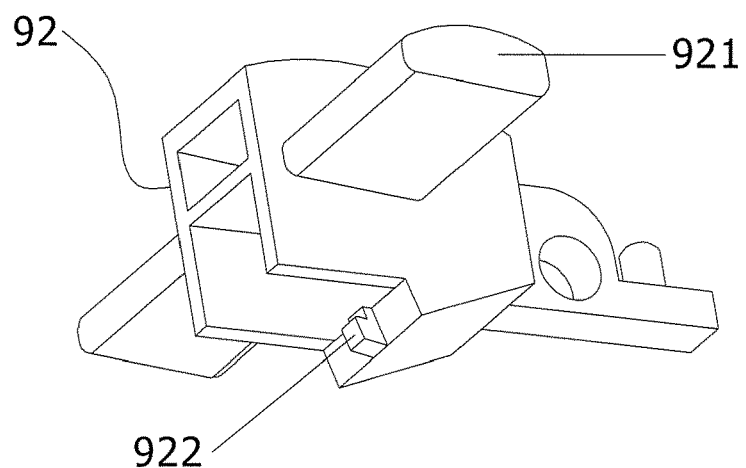
FIG. 11 is a three-dimensional view of a trigger mechanism of the blower according to the embodiment of the present invention.

As illustrated in FIG. 10 and FIG. 11, for ease of adjustment of the air volume when the blower operates, the base 4 is provided with a trigger mechanism 91 configured to control the air force. In addition, the base is further provided with a locking knob 92 configured to lock the trigger mechanism. One side of the trigger mechanism is coupled to the base via an elastic member, and the other end of the trigger mechanism extends out of the base. One end of the locking knob distal from the trigger mechanism is mounted on the base 4 and is disposed above the trigger mechanism 91, and the locking knob is provided with levers 921 extending out of the base on the two sides of the end thereof facing towards the trigger mechanism, and the base is provided with holes cooperating with the levers. The top portion of the trigger mechanism 91 is provided with a locking groove 911, and the locking knob is provided with a lock catch 922 cooperating with the locking groove at the end thereof facing towards the trigger mechanism.

In addition, the base 4 is provided with sockets cooperating with the plugs, and the base is further provided with a gear shifting mechanism configured to regulate the rotation speed of the motor.

During operation, the angle of the blower body 1 relative to the base 4 is adjusted according to the actual needs. During the adjustment, the regulating knob 52 is pressed, and then the limiting block 510 is detached from the open grooves 54, and the connecting member 51 stays in a rotation state. The coupling member and the blower body synchronously rotate with the blower body rotating. For convenience of confirming of the location of the open groove, a scale line corresponding to the central line of the open groove 54 may be designed on the blower body 1, and a scale line corresponding to the limiting block 521 may be designed on the base 4. When the blower body 1 drives the coupling member to rotate and cause the limiting block corresponds to another open groove, the regulating knob 32 is released, and the resetting member 53 restores to its original state. The course of restoration of the resetting member drives the regulating knob 52 to move. After the movement of the regulating knob, the limiting block 521 slides and fixed into the another opened groove 54, thereby implementing regulation of the blower body 1.

According to the distance between the working position and the power source, the power supply may be selected between the battery mechanism and the mains power. When the battery mechanism 8 is selected for power supply, the base 4 is cooperatively coupled to the battery mechanism via the coupling groove 81 and the fixture block 46, and the plug is inserted into the power socket. The illumination mechanism 7 is power on or power off by using the illumination switch 71 according to the actual working environment.

During dust removing and cleaning, the cover plate is stirred to close the fan air outlet, and a dust collection bag is arranged at the dust suction air outlet. After the motor starts, the motor drives the impeller 3 to rotate, then a whirl pool is formed inside the housing, and the air may enter from the air inlet 11 and exits from the dust suction air outlet, as a result, the dust and particles in the air flow are blown to the dust collection bag, while garbage with lager size is blocked by the grid 26 on the housing from entering the blower body. When the blower is used as a fan, the cover plate is stirred to close the dust suction air outlet, and the air enters from the air inlet and exits from the fan air outlet, thereby forming an air flow of the fan.

The rotation speed of the motor is selected by using the gear shifting mechanism according to the actual needs. When the working gear is determined, a force is applied to the trigger mechanism 91 to cause the trigger mechanism to move towards the base 4, and the rotation speed of the motor gradually increases, and the air suction speed and the air blowing speed also increase. When the trigger mechanism moves to its maximum displacement, the air volume and force under the gear is the maximum. If such a working state with the maximum air volume and force needs to be maintained, the lever 921 is used to cause the locking knob 92 to rotate downwards, and then the lock catch 922 may slide and be fixed into the locking groove 911, the trigger mechanism stays in a locking state, and the blower is maintained in said working state. If the air force needs to be adjusted or the blower needs to be closed, a force is applied to the trigger mechanism 91 to cause the trigger mechanism to move by a small distance, then the lever is used to cause the locking knob 92 to move upwards so as to make the lock catch 922 to detach from the locking groove 911 to release the locking. After the trigger mechanism is released, the trigger mechanism restores to its original position under the effect of the elastic member.

For ease of use, a spring may be arranged between the base 4 and the locking knob 92, the spring stays in a compression state when the locking knob 92 locks the trigger mechanism 91, while the locking knob 92 rotates to its original state under the effect of the spring after the locking groove 911 is detached from the lock catch 922.

Besides the above preferred embodiments, the present invention further includes other embodiments. A person skilled in the art would derive various changes and modifications based on the present invention without departing from the spirit of the present invention. Such changes or modifications shall all be considered as falling within the scope defined by the claims of the present invention.

What is claimed is:

1. A blower, comprising:
    a blower body comprising a housing, an impeller arranged inside the housing and a motor arranged in the housing to drive the impeller to rotate, wherein the blower body comprises an air inlet and an air outlet;
    a base; and
    a regulating mechanism, wherein the blower body is mounted on the base via the regulating mechanism, the regulating mechanism comprises a coupling member, a regulating knob and a resetting member, and the blower body is rotatably mounted on the base via the coupling member, the regulating knob is arranged on the base and cooperates with the coupling member to limit the coupling member, and the resetting member is arranged on the base and cooperates with the regulating knob to cause the regulating knob to reset.

2. The blower according to claim 1, further comprising at least two open grooves disposed circumferentially at the end portion of the coupling member cooperating with the base, and a plurality of limiting blocks cooperating with the opened grooves are disposed at the end of the regulating knob cooperating with the coupling member.

3. The blower according to claim 2, wherein the resetting member is a spring with a length direction thereof being parallel to an axial line of the coupling member, a baffle is disposed on the base proximal to the end portion of the coupling member where the open grooves are disposed, the spring and the coupling member are respectively arranged on two sides of the baffle, two ends of the spring are respectively fixed to the regulating knob and the baffle, and the limiting blocks cooperate with the open grooves on the coupling member by crossing the baffle.

4. The blower according to claim 3, wherein the coupling member comprises a first coupling member and a second coupling member with axial lines thereof coinciding, a plurality of fixing holes cooperating with the first coupling member and the second coupling member are arranged on two opposing sides of the blower body, while mounting holes cooperating with the first coupling member and the second coupling member are arranged on the base, the end portion of the first coupling member cooperating with the blower body and an end portion of the second coupling member cooperating with the blower body are both non-circular, the end portion of the first coupling member cooperating with the base and the end portion of the second coupling member cooperating with the base are both circular, the first coupling member or the second coupling member comprises a threading hole, and the open grooves are arranged at the end portion of the first coupling member cooperating with the base or the end portion of the second coupling member cooperating with the base.

5. The blower according to claim 4, wherein the base comprises an upper base and a lower base, one side of the upper base is coupled to the blower body via the first coupling member, one side of the lower base being coupled to the blower body via the second coupling member, and a handle being arranged between the other side of the upper base and the other side of the lower base.

6. The blower according to claim 1, wherein the blower body further comprises a blower cover fixed on an outer wall of the housing, the blower cover comprises an illumination switch configured to switch on-and-off an illumination mechanism.

7. The blower according to claim 6, wherein the illumination mechanism comprises a substrate and a plurality of lamp beads arranged on the substrate, wherein the blower cover comprises a plurality of recess grooves cooperating with the illumination mechanism on the side thereof going against the blower cover, a bottom wall of the recess groove comprises a plurality of fixture holes cooperating with the lamp beads, the substrate being fixed to one side of the blower cover facing towards the housing and the lamp beads extends into the recess grooves after penetrating through the fixture holes, and the blower cover comprises a plurality of transparent plates cooperating with the recess grooves.

8. The blower according to claim 7, wherein the housing comprises an air suction duct at a position thereof corresponding to the air inlet, and the blower cover comprises a recess chamber cooperating with the air suction duct on one side thereof facing towards the housing, wherein the air suction duct comprises a first fixture groove at an end portion thereof distal from the housing, an inner wall of the recess chamber comprises a snap-fit post cooperating with the first fixture groove, and the blower cover comprises an air duct in communication with the recess chamber on one side thereof going against the housing.

9. The blower according to claim 6, wherein the blower body comprises a dust suction air outlet and a fan air outlet, the housing comprises a cover plate configured to close the dust suction air outlet or the fan air outlet, the cover plate is in an arc shape and is slidingly arranged on the inner wall of the housing, an outer wall of the cover plate comprises a shifting block extending out of the housing, and the housing comprises an arc groove cooperating with the shifting block.

10. The blower according to claim 6, wherein the blower further comprises a battery mechanism, and a bottom portion of the base and a top portion of the battery mechanism each comprises a fixture block and a coupling groove cooperating with each other.

* * * * *